UNITED STATES PATENT OFFICE.

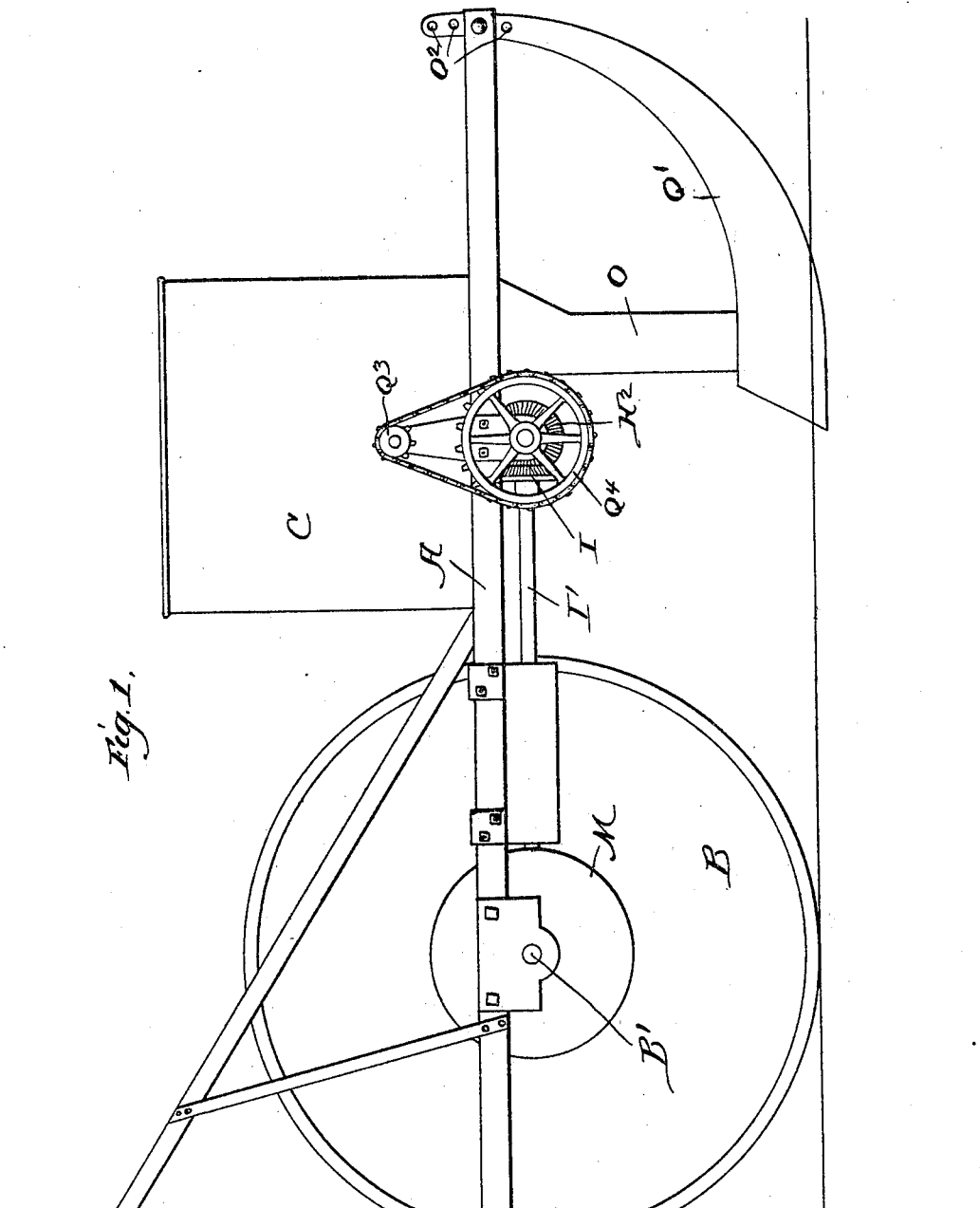

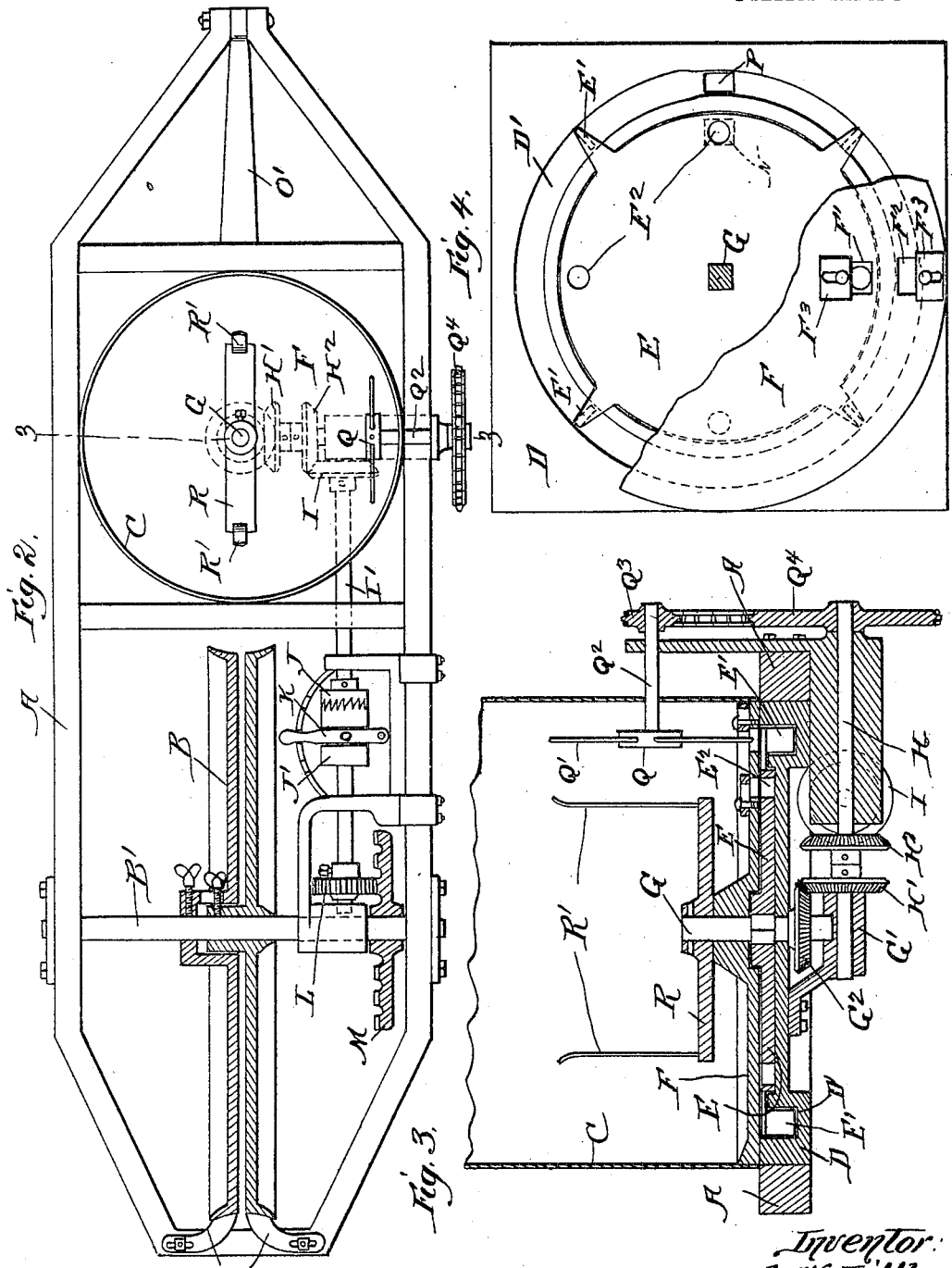

JOSEPH W. LITTLE, OF WESTPOINT, MISSISSIPPI.

SEED-PLANTER.

No. 812,057.      Specification of Letters Patent.      Patented Feb. 6, 1906.

Application filed June 13, 1905. Serial No. 265,011.

*To all whom it may concern:*

Be it known that I, JOSEPH W. LITTLE, a citizen of the United States, residing at Westpoint, county of Clay, and State of Mississippi, have invented a certain new and useful Improvement in Seed-Planters, of which the following is a specification.

My invention relates to a new and useful improvement in seed-planters, and has for its object to provide an extremely simple machine which will plant different kinds of seeds in hills and an equal distance apart and will plant the same amount of seed in each hill, and the distance between the hills may be varied by simply removing one blade and substituting another.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of my improved machine; Fig. 2, a plan view of the machine, the traction or covering wheel and differential gear being shown in section; Fig. 3, a section taken on the line 3 3 of Fig. 2; and Fig. 4, a plan view of the bottom plate of the hopper, a portion of which is broken away to show the feed-plate and bed-plate beneath.

A represents the framework of the machine, which may be of any suitable shape or design.

B is the covering-wheel at the rear end of the machine, which also acts as a traction-wheel for operating the mechanism, this wheel being made in two parts, which parts are adjustable along the shaft for purposes hereinafter to be described.

C is the hopper, adapted to contain the seed.

D is the bed-plate of the feeding mechanism, which bed-plate is secured to the frame of the machine and has formed therein the circular channel D'.

E is the feed-plate, which lies upon the top of the bed-plate in a suitable depression for the same formed in the center, and this feed-plate is adapted to revolve concentric with the groove D. The feed-plate is provided with a plurality of wings or scrapers E', which extend downward into the channel D. The solid portion of the feed-plate inside of the wings or scrapers E' is provided with a plurality of openings $E^2$, formed through the same.

F is a plate arranged over the bed-plate and feed-plate and secured to the bed-plate in any suitable manner. This plate F also forms the bottom of the hopper C, and the feed-plate E is adapted to revolve between the plate F and the bed-plate D.

G is a vertical shaft journaled in the plate F. The bed-plate D and the lower end of the shaft G is also journaled in a bearing G', secured to the under side of the bed-plate, and this bearing G' also forms a bearing for the horizontal shaft H. The plate E is removably secured to the shaft G in any suitable manner, so as to revolve therewith. The most practical means would consist in forming that portion of the shaft which extends through the feed-plate polygonal, so that by removing the plate F the feed-plate may be removed and another substituted in its place. There will be several feed-plates applied to the machine having different numbers of wings or scrapers and different numbers of openings $E^2$, so as to plant the seed in hills nearer together or farther apart.

Secured to the shaft G is a beveled gear-wheel $G^2$, which meshes with a beveled gear-wheel H', secured to the shaft H. $H^2$ is another beveled gear-wheel secured to the shaft H, which meshes with a gear-wheel I, secured to the forward end of a shaft I', which extends rearwardly. The shaft I' is divided into two parts. To one part is secured the clutch member J, and the other member of the clutch J' is feathered upon the other half of the shaft I', and a lever K, pivoted to the frame of the machine and engaging the slidable bar of the clutch, furnishes a means for disengaging or engaging the two halves of the shaft I, and thus the feeding mechanism can be either in or out of action any time desired.

Upon the rearward end of the shaft I is arranged a gear-wheel L, which is adjustable longitudinally along the shaft I'. This gear-wheel L meshes with a differential gear-wheel M, secured to the main shaft B' of the machine, upon which shaft the covering or traction wheel B is secured. This differential gear M is provided with concentric rings of teeth, so that the speed of the shaft I' can be regulated by moving the gear L toward the center of the differential gear M' toward the periphery of the same. Thus it will be seen that as the machine moves forward movement will be transmitted through the shaft I' to revolve the feed-plate E.

The plate F is provided with two openings F' and F², and only one opening is used at a time, for one opening is designed for one particular kind of seed, such as cotton-seed or the like, and the other opening is designed for another kind of seed, such as corn or the like. Sliding covers F³ are arranged adjacent to these openings, so that either one of the openings can be closed at any time desired, or the size of the openings can be decreased, if desired. The opening F' is in alinement with the openings E², formed through the feed-plate, and thus when the opening F' is uncovered seed will fill the opening F', and when one of the openings E² passes underneath the seed will drop down into this opening and be carried around on top of the bed-plate until it reaches an opening N, formed through the bed-plate, which opening N communicates with the feed-tube O, which extends downward to the shoe O', so that the seed may be dropped in a furrow made by the shoe. If the opening F' is closed and the opening F² is open, the seed will pass through the opening F² into the channel D', and then one of the wings or scrapers E' will carry the seed around in the channel until it comes to the opening P, formed through the bed-plate, and as this opening P also communicates with the feed-tube O the seed will be dropped downward into the furrow opened by the shoe O'. The channel D' is formed so as to be only the exact width of the wings or scrapers E' from the point underneath the opening F² to the point where the opening P occurs, the balance of the channel being considerably wider than the wings or scrapers, so as to do away with all friction except when the wing is carrying the seed before it.

When planting seed which is apt to become packed, such as cotton-seed or the like, I provide a means for forcing the seed downward through the opening F², this means consisting of a wheel Q, provided with a number of flexible fingers Q', extending outward from the same, and these fingers are adapted to revolve, so that at their lowest point they will extend downward slightly through the opening F² and force the seed through the opening into the channel. In order to revolve this wheel Q, I provide a shaft Q², journaled in suitable bearings arising from the frame, and on the end of this shaft I provide a chain wheel or pulley Q³, driven from a chain wheel or pulley Q⁴, secured on the outer end of the shaft H.

R is a cross-bar secured to the vertical shaft G inside of the hopper and adapted to revolve with said shaft. Extending upward from each end of the cross-bar are arms R', so that when the cross-bar revolves this cross-bar and arms will act as an agitator to prevent the contents of the hopper packing.

The covering or traction wheel B is composed of two parts, each part independently secured upon the shaft B'. When the ground is dry, the two parts will be placed close together, so that the earth will be packed tightly over the seed; but when the ground is moist the parts may be separated a greater or less distance, as shown in Fig. 2, and this will leave a space between the two parts of the wheel, so that the earth will not be packed directly over the seed, but only upon the sides.

S represents scrapers adjustably secured at the rear of the machine, coming in contact with the periphery of the covering-wheel B to scrape off the mud carried upward by said wheel.

The shoe O' is secured at its forward end to the frame of the machine and is provided with a number of openings O², through which the bolt may pass, so that said shoe can be raised or lowered to regulate the depth of the furrow.

Of course I do not wish to be limited to the exact construction here shown, as slight modifications could be made without departing from the spirit of the invention.

Having thus fully described my invention, what I claim as new and useful is—

1. In a seed-planter, a suitable framework, a furrow-opener arranged at the forward end of the machine, a bed-plate secured in the forward portion of the framework, a feed-tube depending from the bed-plate, a covering-wheel arranged at the rear of the machine directly behind the feed-tube, a seed-hopper arranged above the bed-plate, a vertical shaft extending upward through the center of the bed-plate, mechanism for communicating power from the covering-wheel to this vertical shaft, means for varying the speed of said shaft, a clutch for throwing said shaft in or out of action while the machine is traveling, an annular channel opening upward formed in the bed-plate, a feed-plate arranged above the bed-plate and removably secured to the central vertical shaft, a plurality of scrapers or wings carried by said feed-plate and adapted to travel within the annular channel, the annular channel provided with an opening extending through the bed-plate directly above the feed-tube, the feed-plate provided with a plurality of openings formed through the same, the bed-plate provided with a second opening located directly over the feed-tube, the openings of the feed-plate adapted to pass over said last-named opening of the bed-plate, a plate forming the bottom of the hopper arranged over the feed-plate and secured to the bed-plate, said plate being provided with an opening directly above the annular channel and also an opening under which the openings of the feed-plate will pass, both of said openings being out of register with the openings of the bed-plate connecting with the feed-tube, and means for closing either one of the openings through the upper plate, as and for the purpose specified.

2. In a seed-planter, a framework, a bed-plate secured to the framework near the forward end thereof, a furrow-opener arranged at the forward end of the machine, a feed-tube depending from the bed-plate and communicating with the rearward end of the furrow-opener, a covering-wheel journaled at the rear of the framework directly behind the feed-tube, a gear-wheel secured upon the same shaft as the covering-wheel, the face of said gear-wheel being provided with a series of different-size miter-gears, a seed-hopper arranged over the bed-plate, a central vertical shaft journaled in the bed-plate and extending below the same, a rearward-extending shaft, a movable miter-gear secured to the rear end of this shaft and adapted to be placed in mesh with other of the miter-gears upon the differential gear, a train of gears adapted to transmit movement from the rearwardly-extending shaft to the vertical shaft in the hopper, the rearwardly-extending shaft being composed of two parts, a clutch, one member of which is secured to one half of the shaft, the other member being feathered upon the other half of the shaft, a lever for moving the slidable member in or out of clutch with the fixed member, an annular channel opening upward formed in the bed-plate, said annular channel being provided with an opening through the bed-plate above the feed-tube, a feed-plate removably secured to the vertical shaft, a series of wings or scrapers extending outward radially from said feed-plate and adapted to revolve within the channel, the feed-plate being provided with a series of openings formed through the same, the bed-plate being provided with an opening located over the feed-tube over which the openings of the feed-plate are adapted to pass as the plate revolves, a plate arranged above the feed-plate and removably secured to the bed-plate, this plate forming also the bottom of the hopper, said top plate being provided with an opening located directly above the annular channel, and also an opening under which the openings of the feed-plate will pass, both of said openings being out of alinement with the openings through the bed-plate, movable plates arranged above the top plate for the closing of either of the openings in the top plate, or for decreasing the size of said openings, a wheel journaled within the hopper, said wheel provided with a series of arms radiating from the same, said arms adapted to revolve so that the ends extend into the openings in the top plate directly over the channel, means for revolving this wheel from the power-shaft, and an agitator adapted to revolve within the hopper, as and for the purpose specified.

In testimony whereof I have hereunto affixed my signature in the presence of two subscribing witnesses.

JOSEPH W. LITTLE.

Witnesses:
FRANK A. CREITZ,
S. B. WHITE.